Patented Aug. 16, 1938

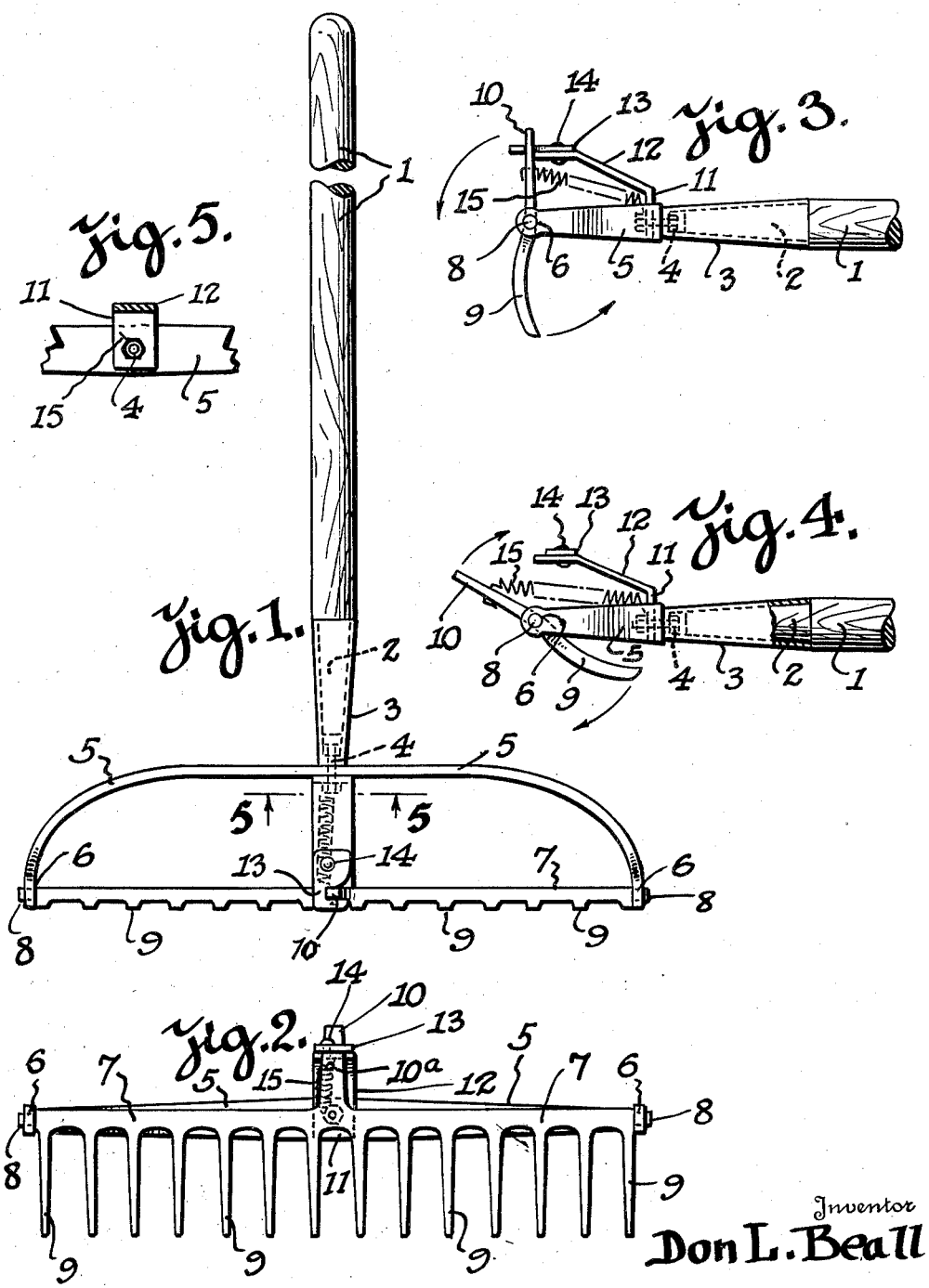

2,126,719

UNITED STATES PATENT OFFICE 2,126,719

SELF-CLEANING RAKE

Don L. Beall, Goshen, Ind.

Application November 13, 1937, Serial No. 174,477

4 Claims. (Cl. 55—10)

The object of my invention is to provide a novel and efficient self-cleaning rake. I attain this and other objects of my invention by the device shown in the accompanying drawing, of which—

Figure 1 is a top plan view of the rake;
Fig. 2 is a front plan view of same;
Fig. 3 is a side elevation of the rake;
Fig. 4 is a side elevation of the rake tilted for self-cleaning; and,
Fig. 5 is a section on line 5—5 of Fig. 1.

Like numerals designate like parts in each of the several views.

Referring to the accompanying drawing illustrating my self-cleaning rake, I provide a suitable handle 1, having a reduced end 2, on which a metal sleeve 3 is secured. This metal sleeve is closed at one end and to the closed end is secured a bolt 4 by which the rake supporting metal strip 5 and base 11 of the stop brace 12 are fastened to the handle.

The rake supporting strip 5 has eyes 6 at its respective ends. The rake 7 is provided with reduced ends 8 which are pivotally mounted in the eyes 6 of supporting strip 5, as shown in Fig. 2. Rake 7 has tines 9 and an upstanding latch arm 10 which is releasably engaged by the lock 13. Member 11 is the base of the stop brace 12, the free end of which abuts against the latch arm 10 to hold it in a position approximately at right angles to that of the rake handle, the latch arm 10 being retained in that position by the pivoted lock 13 which is pivotally mounted on the stop brace 12 by a rivet or other suitable pivot member 14.

I provide a spring 15 which is secured at one end to bolt 4 or stop brace 11 and at the upper end at 10a to the latch arm 10. When the rake is in use its normal position is that shown in Figs. 1 and 3 with the tines disposed at right angles to the handle and with the latch arm 10 engaged by lock 13.

When it is desired to clean the rake, the lock 13 is pushed free of the latch arm 10 and the rake is pushed forward, the tines 9 being rubbed against the ground, as shown in Fig. 4. When the tines are raised from the ground, the spring 15 will swing the rake back to its normal position, as shown in Fig. 3 and it may then be locked in position by the lock member 13. The ends 8 of the rake are loosely or pivotally mounted in the eyes 6 of the rake supporting strip 5 so that the rake can swing or tilt, as shown in Fig. 4, when unlatched.

What I claim is:

1. In a self-cleaning rake, the combination of a handle, a rake supporting strip secured to the handle, the rake having ends pivotally mounted in the rake supporting strip, a latch arm on the rake, a stop brace having an end engaging the latch arm to limit the movement of the rake, a pivoted lock member releasably engaging the latch arm to lock the rake in operative position, and a spring secured to the latch arm tending to swing it from a released cleaning position to an upright and operative raking position.

2. In a self-cleaning rake, the combination of a handle, a metal strip secured to the handle and having eyes at its ends, a rake having projecting ends pivotally mounted in the eyes of the aforesaid metal strip, a latch arm on the rake, a stop brace having an end engaging the latch arm to limit the movement of the rake, a pivoted lock member releasably engaging the latch arm to lock the rake in operative position, and a spring secured to the latch arm tending to swing it from a released cleaning position to an upright and operative raking position.

3. In a self-cleaning rake, the combination of a handle, a curved rake supporting strip, a stop brace, a metal sleeve mounted on the end of the handle, a bolt securing the stop brace and rake supporting strip to the aforesaid sleeve, a rake having ends pivotally mounted on the curved rake supporting strip, a latch arm on the rake positioned to abut against the stop brace to hold the rake in operative position, a lock member pivotally mounted on the stop brace and engaging the latch arm to rigidly hold the rake in operative raking position, and resilient means for returning the rake to its normal raking position after the rake has been cleaned.

4. In a self-cleaning rake, the combination of a handle, a metal strip affixed to the handle, a rake pivotally mounted on said metal strip, means for locking the rake in operative raking position, said means including a pivoted lock member, a latch arm on the rake releasably engageable by said lock member, and a spring secured to the latch arm and to a fixed element of the rake handle to return the rake from a depressed to an upright position after the rake has been cleaned.

DON L. BEALL.